United States Patent
Cheng et al.

(10) Patent No.: US 11,523,090 B2
(45) Date of Patent: Dec. 6, 2022

(54) MOTION DATA EXTRACTION AND VECTORIZATION

(71) Applicant: The Chamberlain Group LLC, Oak Brook, IL (US)

(72) Inventors: Fred Cheng, Los Altos Hills, CA (US); Herman Yau, Sunnyvale, CA (US)

(73) Assignee: The Chamberlain Group LLC, Oak Brook, IL (US)

( * ) Notice: Subject to any disclaimer, the term of this patent is extended or adjusted under 35 U.S.C. 154(b) by 804 days.

(21) Appl. No.: 14/665,810

(22) Filed: Mar. 23, 2015

(65) Prior Publication Data

US 2016/0286171 A1    Sep. 29, 2016

(51) Int. Cl.
 *H04N 7/18* (2006.01)
 *G08B 13/196* (2006.01)

(52) U.S. Cl.
 CPC ....... *H04N 7/183* (2013.01); *G08B 13/19602* (2013.01)

(58) Field of Classification Search
 CPC .... G06K 9/34; G06K 9/481; G08B 13/19602; H04N 7/183
 USPC ........................................................ 348/143
 See application file for complete search history.

(56) References Cited

U.S. PATENT DOCUMENTS

| | | | |
|---|---|---|---|
| 6,164,628 A | 12/2000 | Hoggan | |
| 6,385,772 B1 | 5/2002 | Courtney | |
| 6,396,534 B1 | 5/2002 | Mahler | |
| 6,611,598 B1 | 8/2003 | Hayosh | |
| 6,859,148 B2 | 2/2005 | Miller | |
| 6,933,797 B2 | 8/2005 | Miyahara | |
| 7,772,991 B2 | 8/2010 | Rao | |
| 9,058,524 B2 | 6/2015 | Kuehnle | |
| 10,417,882 B2 | 9/2019 | Bretschneider | |
| 2006/0210164 A1 | 9/2006 | Hideyuki | |

(Continued)

OTHER PUBLICATIONS

Andrew Kirillov; Motion Detection Algorithms; Code Project dated Mar. 27, 2007; https://www.codeproject.com/Articles/10248/Motion-Detection-Algorithms?display=Print; pp. 1-9.

(Continued)

*Primary Examiner* — Christopher S Kelley
*Assistant Examiner* — Ana Picon-Feliciano
(74) *Attorney, Agent, or Firm* — Fitch, Even, Tabin & Flannery LLP

(57) ABSTRACT

A method and a motion data extraction and vectorization system (MDEVS) extract and vectorize motion data of an object in motion with optimized data storage and data transmission bandwidth. The MDEVS includes an image sensor, a motion data processor, and a storage unit. The image sensor captures video data including a series of image frames of the object in motion. The motion data processor detects an object in motion from consecutive image frames, extracts motion data of the detected object in motion from each image frame, and generates a matrix of vectors defining the object in motion for each image frame using the extracted motion data. The motion data includes, for example, image data of the object, trajectory data, relative physical dimensions, a type of the object, time stamp of each image frame, etc. The storage unit maintains the generated matrix of vectors for local storage, transmission, and analysis.

32 Claims, 9 Drawing Sheets

(56) References Cited

U.S. PATENT DOCUMENTS

| | | | |
|---|---|---|---|
| 2007/0098274 A1* | 5/2007 | Ibrahim | H04N 19/513 |
| | | | 382/233 |
| 2008/0162561 A1* | 7/2008 | Naphade | G06F 17/30802 |
| 2009/0245573 A1* | 10/2009 | Saptharishi | G06K 9/00771 |
| | | | 382/103 |
| 2011/0205359 A1* | 8/2011 | Lee | G08B 13/19608 |
| | | | 348/143 |
| 2012/0218406 A1 | 8/2012 | Hanina | |
| 2012/0229630 A1 | 9/2012 | Huang | |
| 2014/0160283 A1* | 6/2014 | Hofman | G06K 9/209 |
| | | | 348/143 |
| 2014/0286424 A1* | 9/2014 | Kim | H04N 7/183 |
| | | | 375/240.16 |
| 2014/0333775 A1* | 11/2014 | Naikal | H04N 7/181 |
| | | | 348/159 |
| 2014/0368649 A1 | 12/2014 | Chen | |
| 2015/0139607 A1* | 5/2015 | Grunberg | H04N 5/217 |
| | | | 386/230 |
| 2015/0381950 A1 | 12/2015 | Su | |
| 2016/0269615 A1 | 9/2016 | Deng | |
| 2016/0286171 A1 | 9/2016 | Cheng | |
| 2019/0385428 A1 | 12/2019 | Bretschneider | |

OTHER PUBLICATIONS

Yuval Kashter, Ofer Levi and Adrian Stern; Optical Compressive Change and Motion Detection; Corresponding Author: stem@bgu.ac.il; Department of Electro-Optics Engineering, Ben-Gurion University of the Negev Israel; pp. 1-23; 2012.

U.S. Appl. No. 15/792,329; filed Oct. 24, 2017; 52 pages.

* cited by examiner

MOTION DATA EXTRACTION AND VECTORIZATION

BACKGROUND

Motion sensing technology is prevalent in today's security sensitive society. However, motion sensing technology has multiple drawbacks, for example, lack of granularity in detection of an object, privacy infringement issues, large data storage size requirements, high data bandwidth requirements for transmitting stored video data, etc. Motion sensing or motion detection is performed in multiple ways, for example, using infrared sensors such as pyroelectric infrared (PIR) sensors, using optics such as digital video cameras, using acoustic sensors, using vibration sensors, etc., to detect motion of an object. Typically, the operation of a PIR sensor is similar to the operation of a motion detection switch that generates an indication signal to indicate presence and movement of an object within a detection range of the PIR sensor. However, the method of detection of the object by the PIR sensor is rudimentary and lacks the ability to provide specific details regarding the nature of events associated with motion of the object. As a result, motion detection using the PIR sensor has limited use in a full surveillance analytic application. Moreover, motion detection using the PIR sensor fails to facilitate an automatic verification of video data in the event of a security alarm. Therefore, a user is required to perform the verification manually by viewing the stored video data.

Another method of motion detection comprises use of a conventional digital video camera configured to implement an image motion sensing algorithm to operate as a motion sensor. Typically, the digital video camera receives video data via an image sensor. An image signal processor processes the video data received from the image sensor to enhance the image quality of the received video data and transmits the processed video data to a video compression processor configured with a video compression technology. The video compression processor compresses the transmitted video data. An image motion detector processor analyzes the compressed video data using a predefined motion detection algorithm. The image motion detector processor generates an indication signal to indicate when an object appears or moves within a detection range of the digital video camera. The indication signal indicates the detection of a motional object. The indication signal triggers transmission of one or more notifications, for example, a short message service (SMS) message, an electronic mail (email), a phone alert, etc., to a designated user. The compressed video data is stored in a local disk or transferred to a server or a cloud storage device in a cloud computing environment for further analytic processing when the indication signal is sent. However, the digital video camera receives the video data directly and therefore, may create personal privacy infringement issues, especially in a corporate environment or a public environment. A privacy concerned user will not want his/her actions in his/her personal life to be monitored continuously and be recorded without his/her prior notice and consent. Moreover, irrespective of the video compression technology used, the compressed video data is substantially sizable and therefore consumes a large amount of power for processing the video data. Hence, motion detection using the digital video camera is rendered unsuitable for battery powered applications. Motion detection using the digital video camera not only consumes storage space fast but also slows down the analysis speed of processing the video data due to the large size of the video data. Furthermore, when the video data is to be transmitted to a cloud storage device over a network, the large sized video data also increases bandwidth usage.

For addressing some of the drawbacks involved with motion detection using a digital video camera, a PIR sensor is typically integrated within a digital camera. Once the PIR sensor detects an object in motion, the PIR sensor turns on a power and control circuit connected to the PIR sensor. The power and control circuit then provides power to the digital camera to record a video of the object in motion. This recorded video provides data necessary for analytical purposes. This method of using the integrated PIR sensor digital camera reduces the high power required for continuous video capture and recording. However, this method of using the integrated PIR sensor digital camera infringes a user's personal privacy when the digital camera is turned on to record and store the video directly. Moreover, size of the recorded video data may be large for data storage or data transmission based on a time period of recording of the video. Each of the above methods involves use of a conventional video camera comprising an image signal processor and a video compression processor that employs a compression algorithm, for example, based on the motion picture experts group (MPEG) format, the H.264 video compression format, etc., to reduce the size of the recorded video data. However, even after compression, the recorded video data is of a very large size.

Hence, there is a long felt but unresolved need for a method and a system that detects motion of an object and a trajectory of the motion of the object, and determines specific details regarding the motion of the object in a privacy sensitive manner, without recording and transferring video data of a large size, by extracting and vectorizing motion data of the object in motion while minimizing power, storage, and bandwidth requirements for transmitting the video data over a network.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The method and the motion data extraction and vectorization system (MDEVS) disclosed herein address the above mentioned needs for detecting motion of an object, for example, a human or an animal, and a trajectory of the motion of the object, and for determining specific details regarding the motion of the object in a privacy sensitive manner, without recording and transferring video data of a large size. The method and the MDEVS disclosed herein extract and vectorize motion data of an object in motion, while minimizing power, storage, and bandwidth requirements for transmitting the video data over a network. The MDEVS detects an object in motion and extracts motion data of the detected object in motion. In an embodiment, the motion data, also referred to as "metadata", comprising, for example, time stamps related to the motion of the detected object can be transferred and stored in a storage unit of the MDEVS. Hence, with the use and processing of motion data, large sized video data is not required. The method disclosed herein employs the MDEVS for extracting and vectorizing motion data of an object in motion with optimized data storage and data transmission bandwidth.

The motion data extraction and vectorization system (MDEVS) disclosed herein comprises an image senor, a motion data processor, and a storage unit. The image sensor captures video data comprising a series of image frames of an object in motion. The motion data processor in operable communication with the image sensor receives the video data from the image sensor. The motion data processor detects an object in motion from consecutive image frames of the received video data and extracts motion data of the detected object in motion from each of the image frames of the received video data. The motion data comprises, for example, image data representing the object in motion, trajectory data of the motion of the object in motion, relative physical dimensions of the object, a type of the object, spatial coordinates of the object in each of the image frames, sequence data of the image frames, time stamp data of each of the image frames, etc. The motion data processor generates a matrix of vectors that defines the object in motion for each of the image frames using the extracted motion data. In an embodiment, each of the vectors of the generated matrix is defined by two or more spatial coordinates. The storage unit maintains the generated matrix of vectors for one or more of local storage, transmission, and analysis.

In one or more embodiments, related systems include but are not limited to circuitry and/or programming for effecting the methods referenced herein; the circuitry and/or programming can be any combination of hardware, software, and/or firmware configured to effect the herein-referenced methods depending upon the design choices of a system designer. Also, various structural elements may be employed depending on the design choices of the system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

DETAILED DESCRIPTION OF THE INVENTION

Figure 1:
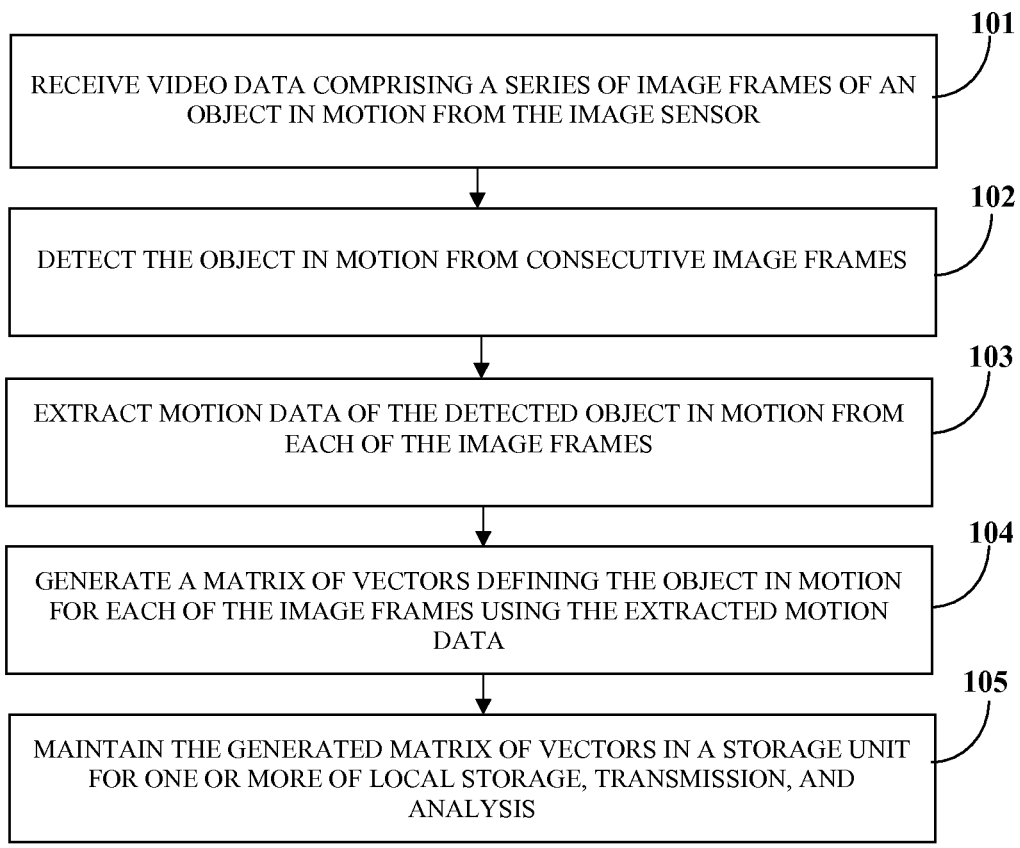
FIG. 1 illustrates a method for extracting and vectorizing motion data of an object in motion with optimized data storage and data transmission bandwidth.

FIG. 1 illustrates a method for extracting and vectorizing motion data of an object in motion with optimized data storage and data transmission bandwidth. As used herein, "vectorizing" refers to a linear transformation of motion data into a matrix of vectors. Also, as used herein, "motion data" refers to metadata associated with the object and motion of the object. In an embodiment, motion data comprises a metadata stream associated with the object and the motion of the object. The method disclosed herein employs a motion data extraction and vectorization system (MDEVS) 300 exemplarily illustrated in FIG. 3 and FIGS. 5-9, for extracting and vectorizing motion data of an object in motion with optimized data storage and data transmission bandwidth. The MDEVS 300 comprises an image sensor 301, a motion data processor 302, a storage unit 303, and an operations unit 304 as exemplarily illustrated in FIG. 3 and FIGS. 5-9. The image sensor 301 is in operable communication with the motion data processor 302 configured to execute computer program instructions for performing one or more steps of the method disclosed herein. In an embodiment, the motion data processor 302 is a computer based executable computer program. In another embodiment, the motion data processor 302 is a dedicated hardware unit configured to perform motion data processing functions. The image sensor 301 of the MDEVS 300 captures video data comprising a series of image frames of an object in motion. After capturing the video data, the image sensor 301 sends the captured video data to the motion data processor 302 or to other modules of the MDEVS 300 comprising, for example, an image signal processor 501 exemplarily illustrated in FIGS. 5-9, a data compression processor 502 exemplarily illustrated in FIGS. 5-6 and FIGS. 8-9, or to the operations unit 304 of the MDEVS 300 for further analysis.

The motion data processor 302 of the motion data extraction and vectorization system (MDEVS) 300, in operable communication with the image sensor 301, receives 101 the video data comprising the series of image frames from the image sensor 301. In an embodiment, the motion data processor 302 processes the received video data for excluding a background of the object in motion. The motion data processor 302 segments video data from each of the image frames for separating a foreground comprising the object in motion from a non-motional background of the object. The motion data processor 302 separates the foreground of the object from the background of the object by discarding or excluding the non-motional background video data for identifying the object in motion or for identifying one or more events of interest associated with the object in motion. The events of interest comprise, for example, presence of the object, location of the object within each of the image frames, number of objects present in an image frame, etc. The motion data processor 302 excludes or discards the non-motional background from the image frames once the motion data processor 302 detects motional objects in consecutive image frames. As used herein, "motional object" refers to a moving object or an object in motion.

The motion data processor 302 detects 102 the object in motion from consecutive image frames, for example, by comparing consecutive image frames with each other while excluding a background of the object in motion. Consider an example where the motion data extraction and vectorization system (MDEVS) 300 comprising the motion data processor 302 is implemented in a digital video camera for extracting and vectorizing motion data of an object. In an embodiment, when the digital video camera is stationary, the motion data processor 302 compares images from consecutive image frames of video data captured by the digital video camera, and distinguishes between a non-motional object and a motional object in the consecutive image frames. The motion data processor 302 excludes the non-motional background objects and images while processing the captured video data. The motion data processor 302 detects the object in motion and then extracts related motion data of the detected object in motion from the image frames of the video data. In an embodiment, the motion data processor 302 compares images from consecutive image frames of video data captured by the digital video camera and distinguishes between positions of an object in each of the image frames for detecting the object in motion. That is, the motion data processor 302 detects an object as a motional object when the object appears in a different position in a consecutive image frame.

After the motion data processor 302 detects the object in motion from consecutive image frames, in an embodiment, the motion data processor 302 compares the detected object in motion with one or more object libraries for confirming the detection of the object in motion. The object libraries comprise, for example, multiple image models of a target object in motion. Once the motion data processor 302 detects a motional object, the motion data processor 302 accesses additional image models from the object libraries to verify validity of the detected motional object. The motion data processor 302 verifies validity of the detected motional object by comparing each of the additional image models with an image of the preliminarily detected motional object. If the comparison results in a positive match, the motion data processor 302 verifies validity of the detected object in motion. In an embodiment, the motion data processor 302 implements two object detection algorithms. By executing the first object detection algorithm, the motion data processor 302 performs a first level motional object detection by comparing consecutive image frames of video data. Further, by executing the first object detection algorithm, the motion data processor 302 crops an image of the detected object in motion from each consecutive image frame and renders a standalone object image without any background image. The motion data processor 302 then compares the standalone object image against predefined object libraries by executing the second object detection algorithm. The second object detection algorithm examines, for example, an object shape, a grey level of a surface color of the object based on a reflection of a physical build of the object, etc. The second object detection algorithm ensures a true detection of an object in motion. The motion data processor 302 prevents false detection of an object in motion by using the first object detection algorithm along with the second object detection algorithm. Once the detection is confirmed by executing the second object detection algorithm, the motion data processor 302 performs motion data extraction from the image frames.

Once the motion data processor 302 detects an object in motion through the consecutive image frames, the motion data processor 302 extracts 103 the motion data of the detected object in motion from each of the image frames. The motion data comprises, for example, image data associated with the object in motion, trajectory data of the motion of the object in motion, relative physical dimensions of an object, a type of an object, spatial coordinates of an object in each of the image frames, that is, relative position coordinates of an object within each of the image frames, sequence data of the image frames, time stamp data of each of the image frames, etc. As used herein, "trajectory data" refers to geometric data associated with a traversal path that an object traverses in space as a function of time. The trajectory data comprises, for example, a length, a position and an orientation of the object in motion, a time stamp of a detected event of motion of the object, etc. Also, as used herein, "relative physical dimension" refer to an absolute measured size dimension of a detected object in a particular image frame of video data. The relative physical dimensions may not reflect the actual size of the detected object unless another object with a known size is also present in the detected image frame of the video data. Thus, the motion data processor 302 extracts multiple features, for example, a motional object, the type of the motional object such as an animal or a person, a size of the motional object, a shape of the motional object, etc., from the video data.

In an embodiment, the motion data processor 302 dynamically selects one or more of multiple predefined data extraction algorithms and an object library based on matching of the extracted motion data with selection criteria. The selection criteria comprise, for example, a type, a size, a shape, etc., of multiple objects. In the method disclosed herein, the motion data processor 302 is preloaded with predefined data extraction algorithms targeting different sizes of objects, types of objects, and other selection criteria. When the extracted motion data matches the selection criteria of a particular object, the motion data processor 302 dynamically selects an appropriate data extraction algorithm and an object library to ensure and optimize an accuracy of the detection of the object in motion and the speed of extraction of the motion data. The method disclosed herein configures and optimizes different data extraction algorithms for different selection criteria, for example, sizes or types of a targeted object in motion. In an embodiment, the motion data processor 302 is preconfigured with a default data extraction algorithm and a predefined object library to extract the motion data of the detected object in motion. The default data extraction algorithm and the predefined object library are targeted at different sizes or types of objects, for example, people, animals, cars, etc.

On receiving the captured video data, the motion data processor 302 detects an object in motion and extracts the motion data from each of the image frames of the video data using the default data extraction algorithm with the predefined object library. In an embodiment, the motion data processor 302 stores the default data extraction algorithm and the predefined object library. In an embodiment, the predefined object library facilitates an accurate detection of an object in motion by reducing a false object detection rate. The motion data processor 302 uses the default data extraction algorithm with the predefined object library to extract the motion data of the detected object in motion of a first image frame. The motion data processor 302 then matches the extracted motion data of the first image frame with the selection criteria for dynamically selecting one or more of multiple predefined data extraction algorithms and an object library. The motion data processor 302 then extracts the motion data of subsequent image frames using the dynamically selected predefined data extraction algorithm and the object library. The motion data processor 302 dynamically selects an optimized data extraction algorithm and an object library for enhancing the accuracy of the detection of the object in motion and the speed of motion data extraction. Due to faster and accurate motion data extraction, the motion data processor 302 enhances accuracy of analytical results obtained on analyzing the video data.

In an embodiment, the method disclosed herein comprises detecting and extracting motion data for multiple motional objects. Similar to detection and validation of a single detected motional object, the motion data processor 302 detects multiple motional objects by comparing consecutive image frames comprising the motional objects and determines validity of the detection of each of the multiple motional objects using the object libraries. For extraction of the motion data, the motion data processor 302 generates a representation box to encircle each valid detected motional object. The representation box comprises a pointer on one of the edges of the representation box to show the orientation and the trajectory to where the detected motional object is heading. Data associated with the detected motional object is present around the representation box. The generated representation box represents image coordinates, that is, coordinates of a tip of the pointer, within the image frame. The data of the image coordinates represents a full trajectory of the detected motional object. The motion data processor 302 determines a relative size of the detected motional object using known image models from the object libraries. The motion data processor 302 records a time stamp of each image frame. The extracted motion data therefore comprises, for example, the pointer, the data around the representation box, the image coordinates, the relative size of the detected motional object, the time stamp of each image frame, etc. The motion data processor 302 repeats the extraction of the motion data for each of the detected motional objects for extracting the motion data for multiple motional objects. The motion data processor 302 stores the extracted motion data in a storage unit 303 of the MDEVS 300. The storage unit 303 transmits the stored motion data to the operations unit 304 for future use and analysis.

The motion data processor 302 generates 104 a matrix of vectors defining the object in motion for each of the image frames using the extracted motion data. For example, the motion data processor 302 generates a matrix of vectors for an image frame using the motion data extracted from that image frame. The motion data processor 302 compiles the extracted motion data into a matrix of vectors for each of the image frames. In an embodiment, the generated matrix of vectors comprises the extracted motion data, for example, an object type, spatial data of an object, a sequence number of an image frame, etc. In an embodiment, the generated matrix comprises one or more vectors. Each of the vectors of the generated matrix is defined by two or more spatial coordinates as exemplarily illustrated in FIG. 2. The spatial coordinates comprise end coordinates of a vector. In an embodiment, the motion data processor 302 represents the generated matrix of vectors by a representation box. The representation box is configured to define prospective trajectory data of motion of the detected object in motion. The representation box is, for example, a box encircling the detected object in motion. In an embodiment, the representation box can be represented by spatial coordinates of corners of the representation box with a pointer positioned on one of the edges of the representation box to represent an orientation and a trajectory to where the detected object is heading.

The motion data processor 302 represents the detected object in motion by the generated matrix of vectors for each of the image frames, thereby reducing a large size of video data to a small size of matrices of vectors. For example, by generating matrices of vectors, the motion data extraction and vectorization system (MDEVS) 300 achieves data reduction ratios ranging, for example, from about 10 to 100 thousand folds when compared to the data reduction ratios of conventional motion data extraction systems. As used herein, "data reduction ratio" refers to a quantity of reduction in the size of data before processing and after processing. With less data to be processed, the MDEVS 300 consumes less power and therefore can be used for battery powered applications.

The storage unit 303 maintains 105 the generated matrix of vectors for local storage, transmission, and/or analysis, for example, for further analytic requirements. Since the motion data extraction and vectorization system (MDEVS) 300 represents and stores the captured video data in multiple matrices of vectors instead of directly transmitting and/or storing the captured video data of the object in a video recording form, the MDEVS 300 therefore, eliminates possible personal privacy infringement issues. Furthermore, since the storage unit 303 stores the motion data sensed by the image sensor 301 in the form of matrices of vectors, the MDEVS 300 facilitates a faster searching speed of the motion data through the matrices of vectors, thereby eliminating a requirement of searching through each of the image frames of the captured video data. Thus, the MDEVS 300 facilitates faster searching and analysis of the motion data. Without recording or transferring video data, the MDEVS 300 uses less power and reduces the stored data file size and bandwidth requirements during data transmission over a network.

The operations unit 304 is in operable communication with the storage unit 303 of the motion data extraction and vectorization system (MDEVS) 300. The operations unit 304 provides an input/output interface for transmitting the generated matrix of vectors from the storage unit 303 to an analytics system (not shown), for example, a physically interfaced server or a remote server in a cloud computing environment, for analysis. As used herein, "cloud computing environment" refers to a processing environment comprising configurable computing physical and logical resources, for example, networks, servers, storage, applications, services, etc., and data distributed over a network, for example, the internet. The cloud computing environment provides on-demand network access to a shared pool of the configurable computing physical and logical resources. The analysis comprises, for example, estimating prospective trajectory data of motion of the detected object in motion at a future time instant, determining a period of presence of the object, determining a velocity of traversal of the detected object in motion, determining gestures of the object, etc. In an embodiment, the analytics system analyzes the extracted motion data comprising, for example, relative physical dimensions of the object, for determining a depth and a path at which the detected object moves within a recorded time. The analytics system uses data from the generated matrices of vectors for an accurate video data analysis required in different applications of the MDEVS 300. Analytical tasks comprising, for example, projecting the detected object's future path of traversal or performing a gesture analysis are required for value added applications, for example, anti-shop lifting applications in the retail industry, patient monitoring, monitoring elderly people, monitoring infants, etc. The analytics system performs these analytical tasks using one or more of multiple analytics algorithms.

In an embodiment, once the motion data processor 302 extracts the motion data from an image frame of the video data, the motion data processor 302 stores this image frame of the video data. Storing the image frame enables further analysis for identifying the detected object. In this embodiment, the storage unit 303 stores the specific image frame in a local storage or the operations unit 304 transmits the specific image frame to one or more analytics systems.

Figure 2:
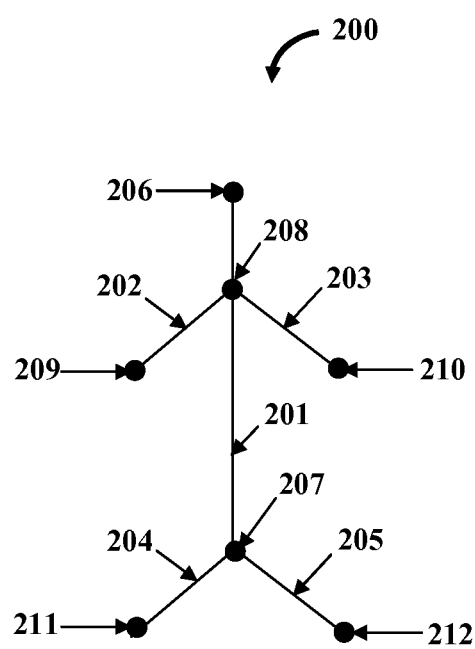
FIG. 2 exemplarily illustrates a representation of a matrix of vectors defining an object in motion.

FIG. 2 exemplarily illustrates a representation of a matrix 200 of vectors 201, 202, 203, 204, and 205 defining an object in motion. The motion data processor 302 of the motion data extraction and vectorization system (MDEVS) 300 exemplarily illustrated in FIG. 3, generates a matrix 200 of vectors 201, 202, 203, 204, and 205 defining the object in motion for each of the image frames using the motion data extracted from each of the image frames. Consider an example where the detected object in motion is a human type of object. The motion data processor 302 uses the extracted motion data comprising, for example, relative physical dimensions of the human to generate a matrix 200 of vectors 201, 202, 203, 204, and 205 of the human in motion. In this example, the motion data processor 302 transforms the extracted motion data comprising, for example, image data of the human, into a matrix 200 comprising five vectors 201, 202, 203, 204, and 205. The motion data processor 302 represents each of the five vectors 201, 202, 203, 204, and 205 by two end coordinates 206 and 207, 208 and 209, 208 and 210, 207 and 211, and 207 and 212 respectively. The motion data processor 302 therefore represents the five vectors 201, 202, 203, 204, and 205 by a total of seven spatial coordinates 206, 207, 208, 209, 210, 211, and 212 to define the human in an image frame. By discarding non-motional background image data of the human, the motion data processor 302 reduces each image frame to a matrix 200 comprising five vectors 201, 202, 203, 204, and 205 formed by the seven spatial coordinates 206, 207, 208, 209, 210, 211, and 212. By recording motion data extracted from consecutive image frames and storing the matrix 200 of vectors 201, 202, 203, 204, and 205 for each of the consecutive image frames, the MDEVS 300 captures a complete motion of the detected human within a detection range of the image sensor 301 of the MDEVS 300 exemplarily illustrated in FIG. 3.

Figure 3:
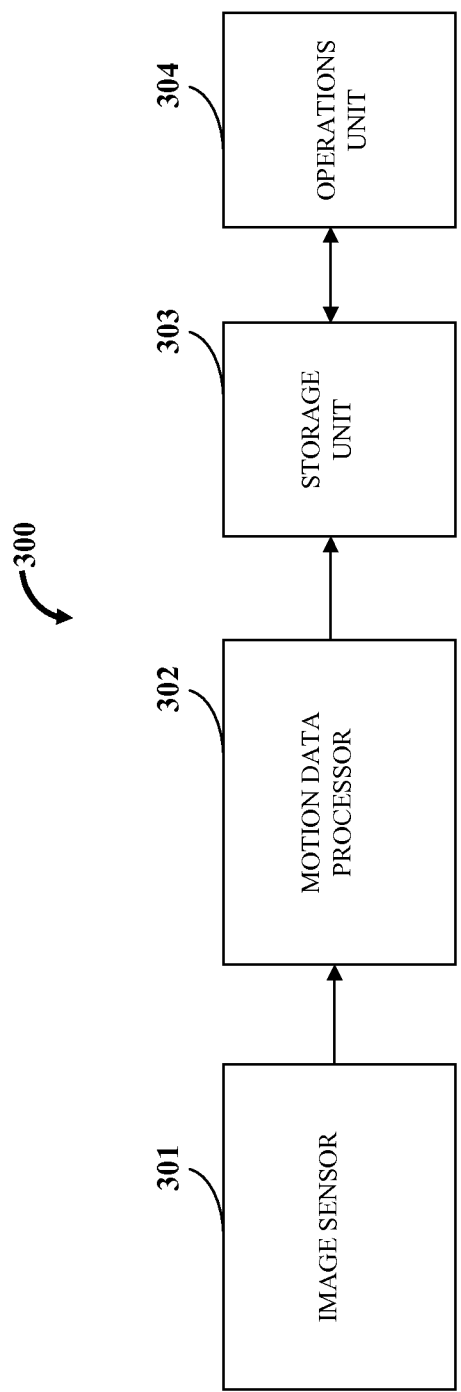
FIG. 3 exemplarily illustrates a motion data extraction and vectorization system for extracting and vectorizing motion data of an object in motion with optimized data storage and data transmission bandwidth.

FIG. 3 exemplarily illustrates the motion data extraction and vectorization system (MDEVS) 300 for extracting and vectorizing motion data of an object in motion with optimized data storage and data transmission bandwidth. In an embodiment, the MDEVS 300 can be configured as an integrated chip and/or a computer system comprising at least one processor configured to execute computer program instructions for extracting and vectorizing motion data of an object in motion with optimized data storage and data transmission bandwidth. In an embodiment, the MDEVS 300 can be built in a hardware chip in different hardwire implementations as disclosed in the detailed descriptions of FIGS. 5-9. In an embodiment, the MDEVS 300 can be configured and built as a computer that executes detection and extraction algorithms and programs. The single chip implementation of the MDEVS 300 can be of substantial market value and can be easily developed using chip manufacturing technologies.

As exemplarily illustrated in FIG. 3, the MDEVS 300 comprises the image sensor 301, the motion data processor 302, the storage unit 303, and the operations unit 304. The image sensor 301, for example, a complementary metal-oxide semiconductor (CMOS) image sensor or a charge-coupled device (CCD) image sensor captures video data comprising a series of image frames of the object in motion. The motion data processor 302 is in operable communication with the image sensor 301. The motion data processor 302 receives the captured video data from the image sensor 301, detects an object in motion from consecutive image frames of the received video data, extracts motion data of the detected object in motion from each of the image frames of the received video data, and generates a matrix of vectors using the extracted motion data as disclosed in the detailed description of FIG. 1.

The motion data processor 302 refers to any one or more microprocessors, central processing unit (CPU) devices, finite state machines, computers, microcontrollers, digital signal processors, logic, a logic device, an electronic circuit, an application specific integrated circuit (ASIC), a field-programmable gate array (FPGA), a chip, etc., or any combination thereof, capable of executing computer programs or a series of commands, instructions, or state transitions. The motion data processor 302 may also be implemented as a processor set comprising, for example, a general purpose microprocessor and a math or graphics co-processor. The motion data processor 302 is selected, for example, from the Intel® processors such as the Itanium® microprocessor or the Pentium® processors, Advanced Micro Devices (AMD®) processors such as the Athlon® processor, UltraSPARC® processors, microSPARC® processors, hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc.

The storage unit 303 is in operable communication with the motion data processor 302. The storage unit 303 is any storage area or medium that can be used for storing data and files. In an embodiment, the storage unit 303 is configured as a database, for example, a disk storage database. The storage unit 303 is, for example, a structured query language (SQL) data store or a not only SQL (NoSQL) data store such as the Microsoft® SQL Server®, the Oracle® servers, the MySQL® database of MySQL AB Company, the mongoDB® of MongoDB, Inc., the Neo4j graph database of Neo Technology Corporation, the Cassandra database of the Apache Software Foundation, the HBase™ database of the Apache Software Foundation, etc. In another embodiment, the storage unit 303 can also be a location on a file system. In another embodiment, the storage unit 303 is configured as a cloud based database implemented in a cloud computing environment, where computing resources are delivered as a service over a network. The network is, for example, the internet, an intranet, a wired network, a wireless network, a network that implements Wi-Fi® of the Wi-Fi Alliance Corporation, Bluetooth® of Bluetooth Sig, Inc., an ultra-wideband network (UWB), a wireless universal serial bus (USB) network, a network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a long-term evolution (LTE) mobile communication network, a public telephone network, etc., a local area network, a wide area network, an internet connection network, an infrared network, etc., or a network formed from any combination of these networks. The storage unit 303 stores the motion data extracted by the motion data processor 302 and the matrix of vectors generated by the motion data processor 302. The storage unit 303 maintains the generated matrix of vectors for local storage, transmission, and/or analysis. The storage unit 303 receives and stores the generated matrices of vectors locally or transfers the generated matrices of vectors to an external database, for example, a cloud database over a network for further analysis. In an embodiment, the motion data processor 302 communicates with the storage unit 303 remotely via a network.

In another embodiment, the storage unit 303 is, for example, a random access memory (RAM) or another type of dynamic storage device that stores information and instructions for execution by the motion data processor 302. The storage unit 303 also stores temporary variables and other intermediate information used during execution of the instructions by the motion data processor 302. In another embodiment, the storage unit 303 is configured as a combination of a read only memory (ROM) that stores static information and instructions for the motion data processor 302 and another type of static storage device that stores the extracted motion data and the matrices generated by the motion data processor 302.

The operations unit 304 of the motion data extraction and vectorization system (MDEVS) 300 is in operable communication with the storage unit 303 and comprises physical interfaces, input devices, and output devices required, for example, for interfacing with external devices, for example, external analytics systems. The operations unit 304 transmits the generated matrix of vectors from the storage unit 303 to an external analytics system (not shown) for analysis.

In an embodiment, the image sensor 301 captures one or more snapshots of the detected object in motion on receiving an indication from the motion data processor 302, for facilitating identification and analysis of the detected object in motion from each of the image frames of the video data. For example, the captured snapshots can be processed for video analytic purposes. The snapshots provide an image of the detected object for identification of the detected object, further motional object recognition and identification, or other analytical purposes. The image sensor 301 captures a snapshot of the detected object in motion with clarity for accurate object recognition and identification while the motion data processor 302 extracts the motion data of the detected object in motion and a trajectory of the motion of the detected object. The motion data processor 302 generates and transmits an indication signal to the image sensor 301 for capturing a snapshot of the detected object in motion and stores the extracted motion data in the form of multiple matrices of vectors in the storage unit 303.

The motion data extraction and vectorization system (MDEVS) 300 disclosed herein is not limited to a computer system or a digital camera employing the motion data processor 302. In an embodiment, the MDEVS 300 is a hardware unit that employs a state machine, a pure state machine hardware base, a controller, a microcontroller, a controller with a hardware unit, or a computer with a hardware unit. A pure state machine does not possess a memory and can be represented by a single state transition table. In an embodiment, the MDEVS 300 comprises a memory that the pure state machine can use for motional object detection and motion data extraction. For purposes of illustration, the detailed description refers to the MDEVS 300 being run locally on a computer system or a digital camera; however the scope of the method and MDEVS 300 disclosed herein is not limited to the MDEVS 300 being run locally on a computer system or a digital camera via an operating system and the motion data processor 302, but may be extended to run remotely over a network by employing a web browser and a remote server, a mobile phone, or other electronic devices. One or more portions of the MDEVS 300 may be distributed across one or more computer systems (not shown) coupled to the network.

Figure 4:
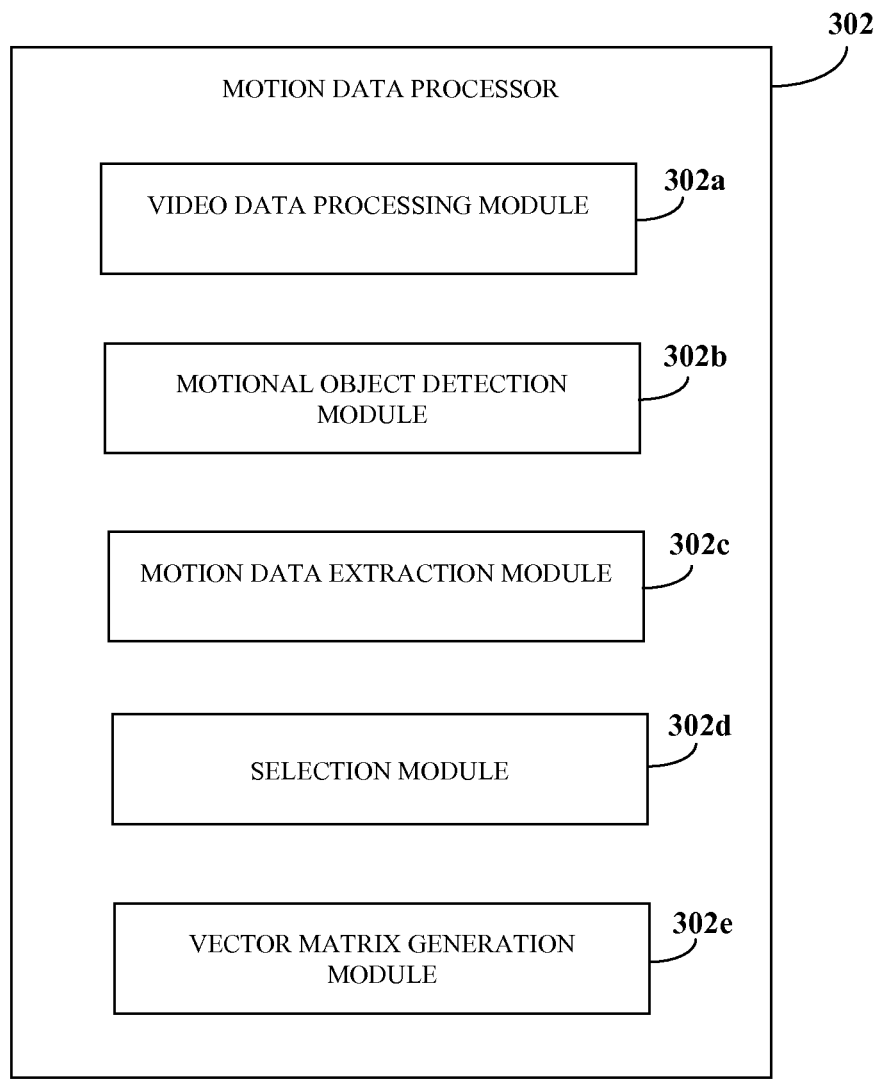
FIG. 4 exemplarily illustrates modules executable by a motion data processor of the motion data extraction and vectorization system for extracting and vectorizing motion data of an object in motion with optimized data storage and data transmission bandwidth.

FIG. 4 exemplarily illustrates modules 302a, 302b, 302c, 302d, and 302e executable by the motion data processor 302 of the motion data extraction and vectorization system (MDEVS) 300 exemplarily illustrated in FIG. 3, for extracting and vectorizing motion data of an object in motion with optimized data storage and data transmission bandwidth. The modules 302a, 302b, 302c, 302d, and 302e are configured as hardware modules, or software modules, or firmware modules, or any combination thereof. The modules executable by the motion data processor 302 comprise a video data processing module 302a, a motional object detection module 302b, a motion data extraction module 302c, a selection module 302d, and a vector matrix generation module 302e. The video data processing module 302a processes the video data received from the image sensor 301 exemplarily illustrated in FIG. 3, for excluding a background of the object in motion. The motional object detection module 302b detects the object in motion from consecutive image frames of the processed video data. The motional object detection module 302b compares consecutive image frames of the processed video data received from the video data processing module 302a with each other for detecting the object in motion, while excluding the background of the object in motion. The motional object detection module 302b executes a first level object detection algorithm to detect a motional object. The motional object detection module 302b then crops an image of the detected motional object from the specific image frame. The motional object detection module 302b compares the detected object in motion with one or more object libraries for confirming the detection of the object in motion. The motional object detection module 302b calls and executes a second level object detection algorithm to further verify the detected motional object by examining, for example, a shape, surface color grey level of the object, etc., against a predefined object library. If there is a high degree of match, the motional object detection module 302b confirms the detection of the motional object. The specific image frame that is used to crop the image of the detected object is saved as a snapshot for further use. The snapshot is stored in the storage unit 303.

The motion data extraction module 302c extracts the motion data of the detected object in motion from each of the image frames. The selection module 302d dynamically selects one or more of multiple predefined data extraction algorithms and an object library based on matching of one or more of the extracted motion data with selection criteria. The motion data extraction module 302c extracts the motion data of subsequent image frames using the dynamically selected predefined data extraction algorithm and the object library. The vector matrix generation module 302e generates a matrix of vectors defining the object in motion for each of the image frames using the extracted motion data. The motion data processor 302 executes the video data processing module 302a, the motional object detection module 302b, the motion data extraction module 302c, the selection module 302d, and the vector matrix generation module 302e.

Disclosed herein is also a computer program product comprising a non-transitory computer readable storage medium that stores computer program codes comprising instructions executable by the motion data processor 302 for extracting and vectorizing motion data of an object in motion with optimized data storage and data transmission bandwidth. As used herein, "non-transitory computer readable storage medium" refers to all computer readable media, for example, non-volatile media such as optical discs or magnetic disks, volatile media such as a register memory, a processor cache, etc., and transmission media such as wires that constitute a system bus coupled to the processor, except for a transitory, propagating signal. The computer program product disclosed herein comprises a first computer program code for detecting an object in motion from consecutive image frames of video data received from the image sensor 301; a second computer program code for extracting motion data of the detected object in motion from each of the image frames of the video data; and a third computer program code for generating a matrix of vectors configured to define the object in motion for each of the image frames using the extracted motion data.

In an embodiment, the first computer program code comprises a fourth computer program code for comparing consecutive image frames with each other for detecting the object in motion, while excluding a background of the object in motion; and a fifth computer program code for comparing the detected object in motion with one or more object libraries for confirming the detection of the object in motion. In an embodiment, the second computer program code comprises a sixth computer program code for dynamically selecting one or more of multiple predefined data extraction algorithms and an object library based on matching of one or more of the extracted motion data with the selection criteria. In this embodiment, the second computer program code further comprises a seventh computer program code for extracting motion data of subsequent image frames using the dynamically selected predefined data extraction algorithms and the object library.

The computer program product disclosed herein further comprises one or more additional computer program codes for performing additional steps that may be required and contemplated for extracting and vectorizing motion data of an object in motion with optimized data storage and data transmission bandwidth. In an embodiment, a single piece of computer program code comprising computer executable instructions performs one or more steps of the method disclosed herein for extracting and vectorizing motion data of an object in motion with optimized data storage and data transmission bandwidth. The computer program codes comprising computer executable instructions are embodied on the non-transitory computer readable storage medium. The motion data processor 302 retrieves these computer executable instructions and executes them. When the computer executable instructions are executed by the motion data processor 302, the computer executable instructions cause the motion data processor 302 to perform one or more steps of the method for extracting and vectorizing motion data of the object in motion with optimized data storage and data transmission bandwidth.

Figure 5:
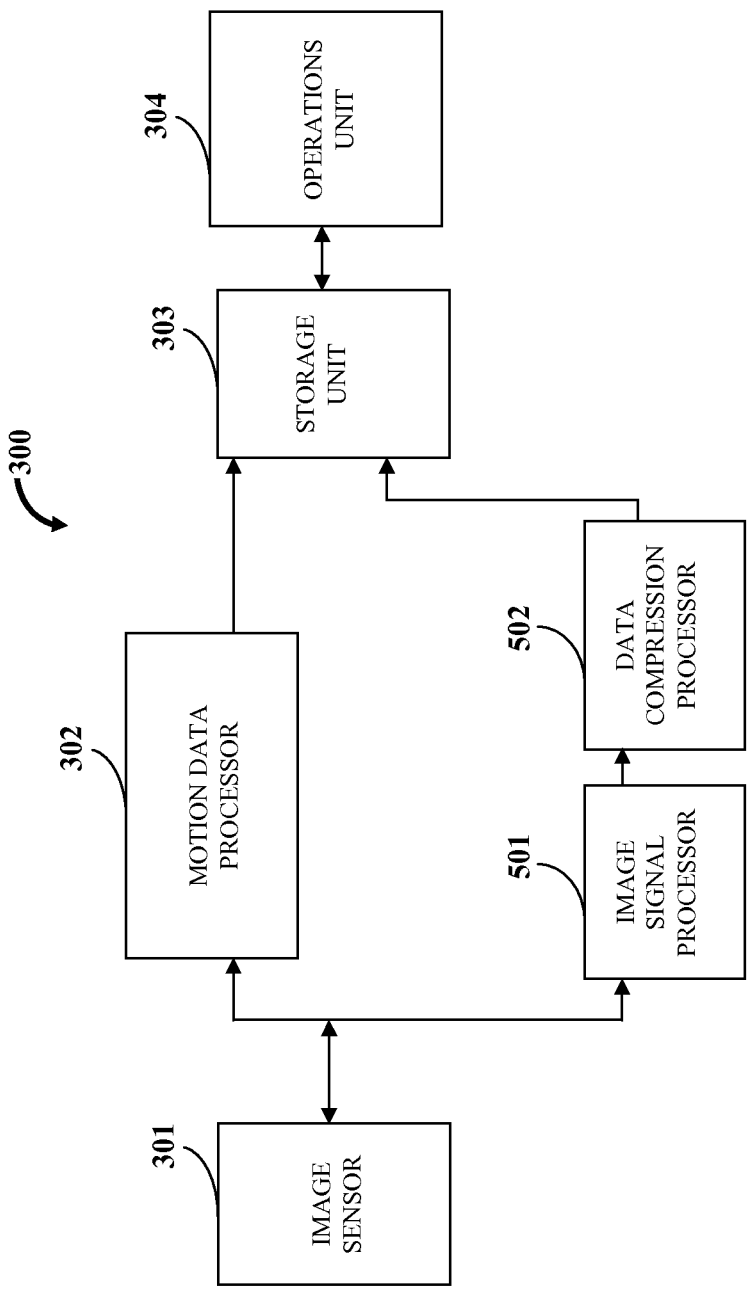
FIG. 5 exemplarily illustrates an implementation of the motion data extraction and vectorization system for extracting and vectorizing motion data of an object in motion with optimized power consumption.

FIG. 5 exemplarily illustrates an implementation of the motion data extraction and vectorization system (MDEVS) 300 for extracting and vectorizing motion data of an object in motion with optimized power consumption. In this implementation of the MDEVS 300, the MDEVS 300 comprises an image signal processor 501 and a data compression processor 502 that are positioned in parallel communication with the motion data processor 302 of the MDEVS 300. The image signal processor 501 and the data compression processor 502 are disabled when motion of the object is not detected for optimizing power consumption required for capture of the video data. The image sensor 301 captures video data comprising a series of image frames of an object in motion as disclosed in the detailed description of FIG. 1. Once the motion data processor 302 detects the object in motion, the motion data processor 302 extracts the motion data from each of the image frames from the enhanced video stream received from the image sensor 301. In an embodiment, the motion data processor 302 sends signals to turn on both the image signal processor 501 and the data compression processor 502.

In an embodiment, the image signal processor 501 is in operable communication with the image sensor 301 and enhances image quality of the captured video data when the motion data extraction and vectorization system (MDEVS) 300 is retrofitted in conventional video capturing devices, for example, video cameras, camera chips, video data compression chips, etc., for capturing the video data. In an embodiment, the image signal processor 501 receives the captured video data from the image sensor 301 for processing and enhancing video image quality of the captured video data. Positioning the image signal processor 501 and the data compression processor 502 in parallel communication with the motion data processor 302 reduces power consumption by keeping the image signal processor 501 and the data compression processor 502 powered off until the motion data processor 302 detects motion of an object in a detection range of the image sensor 301. In this embodiment, the data compression processor 502 receives the enhanced video data from the image signal processor 501 and compresses the enhanced video data to reduce the data size. In another embodiment, the data compression processor 502 is in operable communication with the image sensor 301 and compresses the captured video data. The motion data processor 302 generates a matrix of vectors using the extracted motion data and transmits the generated matrix of vectors to the storage unit 303 for storage. Furthermore, the data compression processor 502 transmits the compressed video data to the storage unit 303 for storage. The storage unit 303 stores the generated matrix of vectors and the compressed video data. The operations unit 304 transmits the generated matrix of vectors and the compressed video data from the storage unit 303 to an analytics system (not shown).

Figure 6:
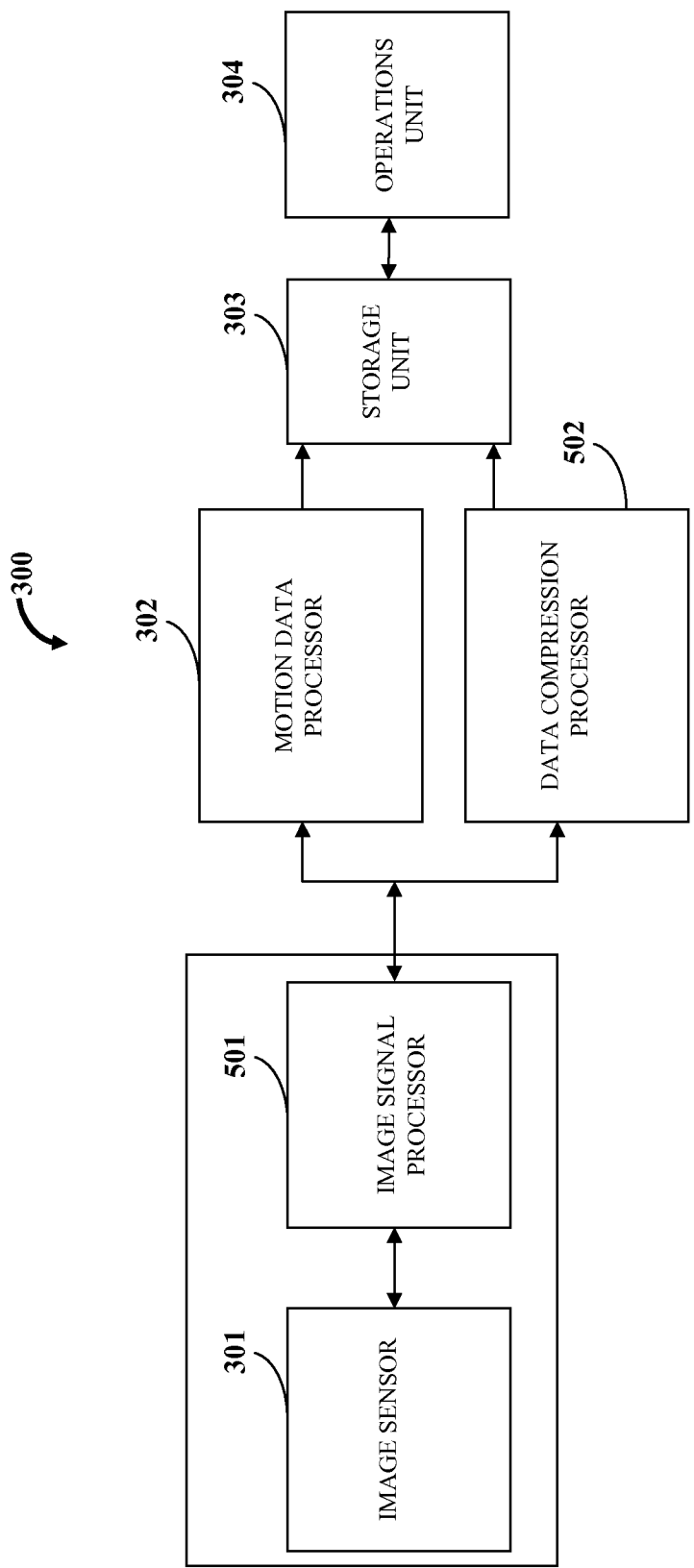
FIG. 6 exemplarily illustrates another implementation of the motion data extraction and vectorization system for extracting and vectorizing motion data of an object in motion with optimized power consumption.

FIG. 6 exemplarily illustrates another implementation of the motion data extraction and vectorization system (MDEVS) 300 for extracting and vectorizing motion data of an object in motion with optimized power consumption. In this implementation of the MDEVS 300, the image signal processor 501 is integrated with the image sensor 301 of the MDEVS 300 for enhancing an image quality of the video data received from the image sensor 301. Furthermore, the image signal processor 501 is in operable communication with the motion data processor 302 and the data compression processor 502. In this implementation, the motion data processor 302 is positioned in parallel communication with the data compression processor 502. In an embodiment, the MDEVS 300 is configured as a retrofit of a video camera for extracting and vectorizing motion data of an object in motion with optimized power consumption. In an embodiment, the integrated image signal processor 501 enhances the video data captured by the image sensor 301 before transferring the captured video data to the motion data processor 302 for motional object detection and motion data extraction and vectorization. In an embodiment, the image signal processor 501 dynamically enhances image granularity of the video data received from the image sensor 301 for facilitating extraction of the motion data from each of the image frames by the motion data processor 302. In another embodiment, the image signal processor 501 of the MDEVS 300 dynamically enhances an image granularity of the enhanced video data for facilitating an optimized extraction of the motion data by the motion data processor 302 from each of the image frames comprising the enhanced video data. The image signal processor 501 integrated with the image sensor 301 transmits the enhanced video data to the motion data processor 302 and the data compression processor 502. The motion data processor 302 detects the motional object, extracts the motion data from the enhanced video data, and generates the matrix of vectors. The storage unit 303 stores the extracted motion data and the generated matrix of vectors received from the motion data processor 302. The operations unit 304 transmits the stored data for analysis. In an embodiment, the motion data processor 302 sends a signal to turn on the data compression processor 502 to compress the enhanced video data received from the image signal processor 501 for saving power consumption and compressing the storage size of the enhanced video data, thereby reducing the amount of total processing power required for capture of the video data with the motional object, the motional object detection, and the motion data extraction and vectorization for further video analytic needs.

Figure 7:
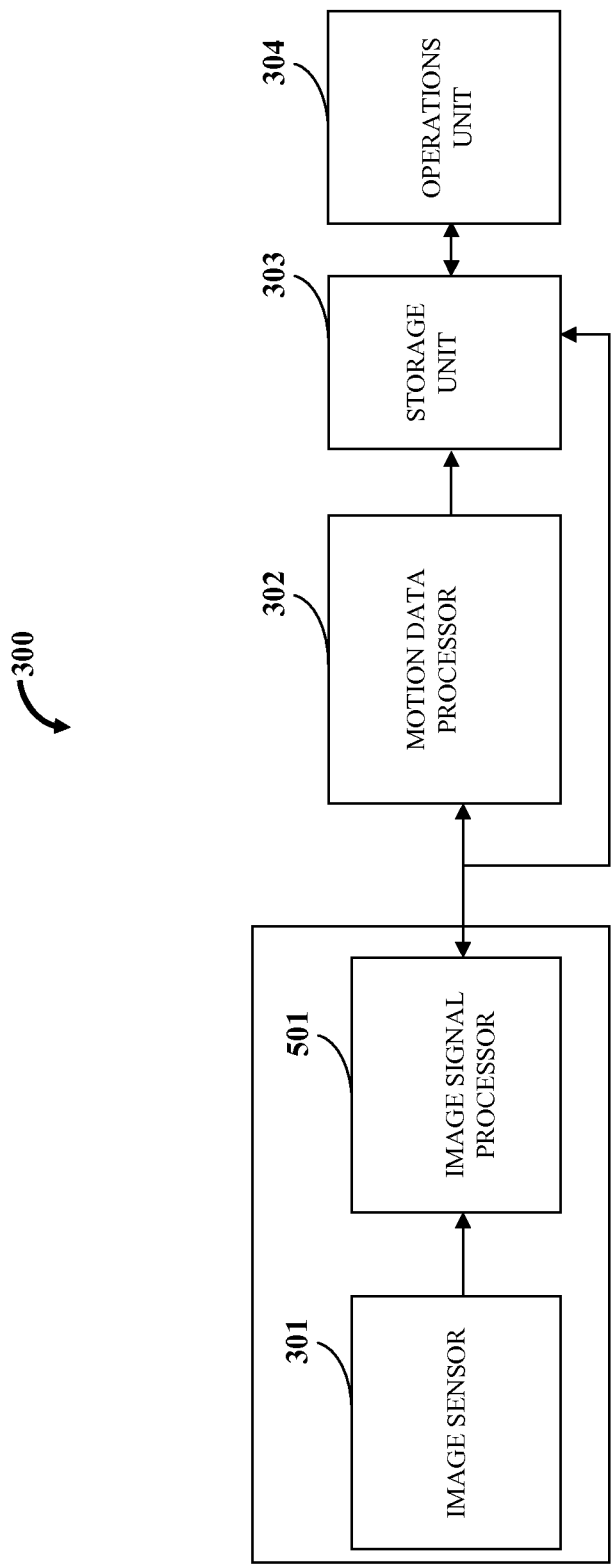
FIG. 7 exemplarily illustrates another implementation of the motion data extraction and vectorization system for extracting and vectorizing motion data of an object in motion with optimized data storage and data transmission bandwidth.

FIG. 7 exemplarily illustrates another implementation of the motion data extraction and vectorization system (MDEVS) 300 for extracting and vectorizing motion data of an object in motion with optimized data storage and data transmission bandwidth. In this implementation of the MDEVS 300, the image signal processor 501 is integrated with the image sensor 301. Furthermore, the image signal processor 501 is in operable communication with the motion data processor 302. In this embodiment, the image signal processor 501 enhances the image quality of the video data received from the image sensor 301. The motion data processor 302 receives the enhanced video data from the image signal processor 501, detects the object in motion and extracts the motion data from the enhanced video data, and generates the matrix of vectors for the detected object in motion. In this embodiment, the storage unit 303 stores and transmits the enhanced video data and the generated matrix of vectors to the operations unit 304.

Figure 8:
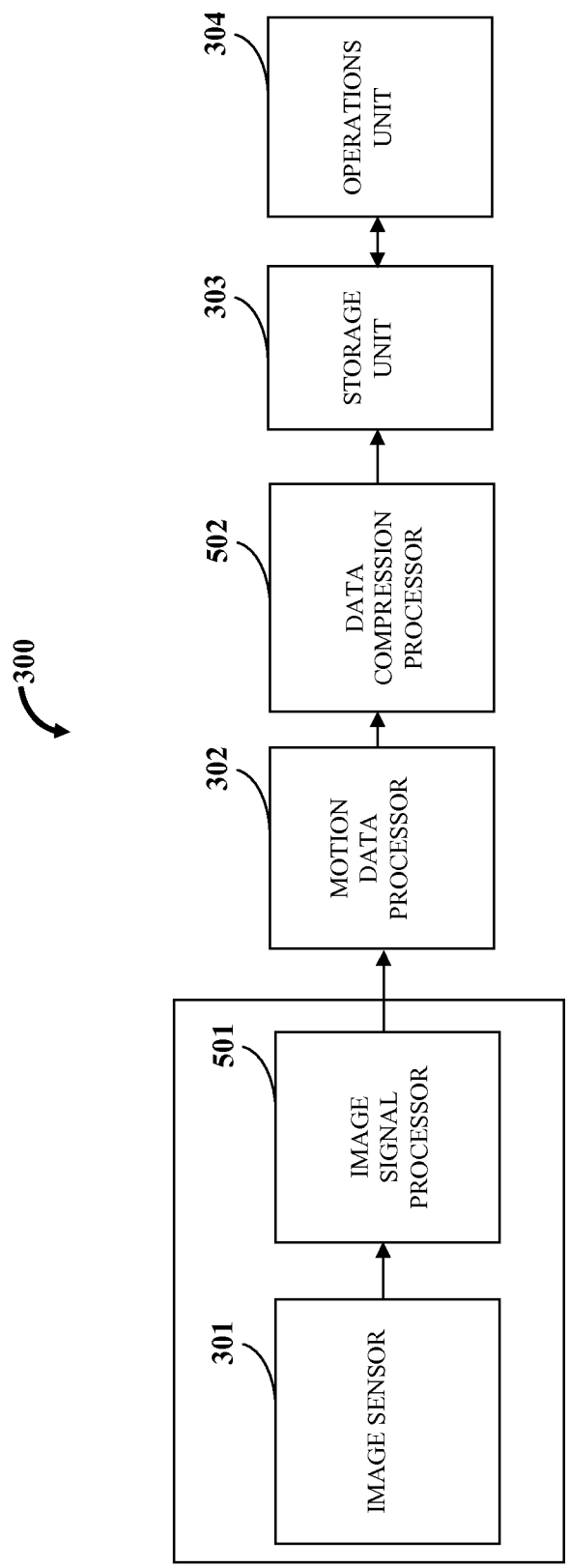
FIG. 8 exemplarily illustrates another implementation of the motion data extraction and vectorization system for extracting and vectorizing motion data of an object in motion with optimized data storage and data transmission bandwidth.

FIG. 8 exemplarily illustrates another implementation of the motion data extraction and vectorization system (MDEVS) 300 for extracting and vectorizing motion data of an object in motion with optimized data storage and data transmission bandwidth. In this implementation of the MDEVS 300, the motion data processor 302 is operably connected in series between the data compression processor 502 and the image signal processor 501 integrated with the image sensor 301. The image signal processor 501 enhances image quality of the video data received from the image sensor 301. FIG. 8 exemplarily illustrates incorporation of the MDEVS 300 used for extracting and vectorizing motion data of a detected object in motion, in a conventional digital video camera. When the conventional digital video camera comprises the image signal processor 501 integrated with the image sensor 301, the motion data processor 302 is operably connected in between the image signal processor 501 and the data compression processor 502 for extracting and vectorizing motion data of the detected object in motion from the video data enhanced by the image signal processor 501. In this embodiment, the data compression processor 502 is positioned in operable series communication with the motion data processor 302 and compresses the motion data that is extracted and vectorized by the motion data processor 302. The storage unit 303 stores the compressed motion data and transmits the compressed motion data to the operations unit 304.

Figure 9:
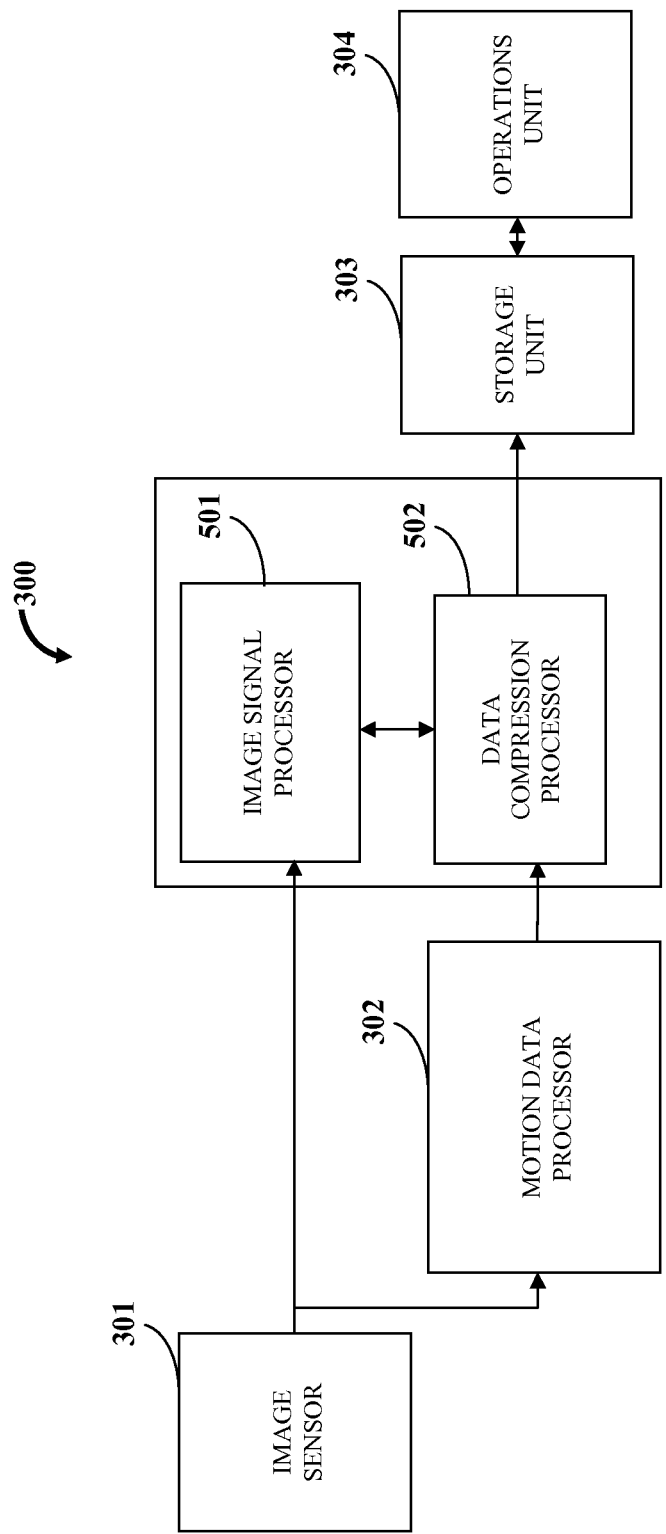
FIG. 9 exemplarily illustrates another implementation of the motion data extraction and vectorization system for extracting and vectorizing motion data of the object in motion with optimized data storage and data transmission bandwidth.

FIG. 9 exemplarily illustrates another implementation of the motion data extraction and vectorization system (MDEVS) 300 for extracting and vectorizing motion data of an object in motion with optimized data storage and data transmission bandwidth. In this implementation of the MDEVS 300, the motion data processor 302 is operably connected between the image sensor 301 and the data compression processor 502 integrated with the image signal processor 501. FIG. 9 exemplarily illustrates incorporation of the MDEVS 300 used for extracting and vectorizing motion data of an object in motion, in a conventional digital video camera. When the conventional digital video camera comprises the image signal processor 501 integrated with the data compression processor 502, the motion data processor 302 is operably connected between the image sensor 301 and the data compression processor 502 for extracting and vectorizing the motion data of an object in motion from the video data received from the image sensor 301. The motion data processor 302 detects an object in motion, extracts motion data of the detected object in motion, and generates matrices of vectors defining the detected object in motion. These matrices of vectors then pass through the data compression processor 502. The data compression processor 502 compresses the matrices of vectors to a smaller file size by using a specific compression algorithm. In this embodiment, the data compression processor 502 also compresses the extracted motion data received from the motion data processor 302. The storage unit 303 stores and transmits the compressed motion data and the compressed matrices of vectors received from the data compression processor 502 to the operations unit 304 for analysis. In another embodiment, the image signal processor 501 is not in operable communication with the motion data processor 302 and connects directly to the image sensor 301 for enhancing the video data received from the image sensor 301. In this embodiment, the data compression processor 502 compresses the enhanced video data received from the image signal processor 501. The storage unit 303 stores the compressed video data received from the data compression processor 502 and transmits the compressed video data to the operations unit 304. When the operations unit 304 transmits the matrices of vectors to an external analytics system (not shown), the external analytics system decompresses the compressed matrices of vectors for analysis.

In an embodiment, the storage unit 303 of the motion data extraction and vectorization system (MDEVS) 300 stores the enhanced video data received from the image signal processor 501, the compressed video data received from the data compression processor 502, the extracted motion data received from the motion data processor 302, the compressed motion data received from the data compression processor 502, the generated matrix of vectors received from the motion data processor 302, and the compressed matrix of vectors received from the data compression processor 502.

It will be readily apparent that the various methods, algorithms, and computer programs disclosed herein may be implemented on computer readable media appropriately programmed for computing devices. As used herein, "computer readable media" refers to non-transitory computer readable media that participate in providing data, for example, instructions that may be read by a computer, a processor or a similar device. Non-transitory computer readable media comprise all computer readable media, for example, non-volatile media, volatile media, and transmission media, except for a transitory, propagating signal. Non-volatile media comprise, for example, optical discs or magnetic disks and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to a processor, etc. Common forms of computer readable media comprise, for example, a floppy disk, a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

The computer programs that implement the methods and algorithms disclosed herein may be stored and transmitted using a variety of media, for example, the computer readable media in a number of manners. In an embodiment, hard-wired circuitry or custom hardware may be used in place of, or in combination with, software instructions for implementation of the processes of various embodiments. Therefore, the embodiments are not limited to any specific combination of hardware and software. In general, the computer program codes comprising computer executable instructions may be implemented in any programming language. Some examples of programming languages that can be used comprise C, C++, C#, Java®, JavaScript®, Fortran, Ruby, Perl®, Python®, Visual Basic®, hypertext preprocessor (PHP), Microsoft® .NET etc. Other object-oriented, functional, scripting, and/or logical programming languages may also be used. The computer program codes or software programs may be stored on or in one or more mediums as object code. Various aspects of the method and the motion data extraction and vectorization system (MDEVS) 300 disclosed herein may be implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. Various aspects of the method and the MDEVS 300 disclosed herein may be implemented as programmed elements, or non-programmed elements, or any suitable combination thereof. The computer program product disclosed herein comprises one or more computer program codes for implementing the processes of various embodiments.

Where databases are described such as the storage unit 303, it will be understood by one of ordinary skill in the art that (i) alternative database structures to those described may be readily employed, and (ii) other memory structures besides databases may be readily employed. Any illustrations or descriptions of any sample databases disclosed herein are illustrative arrangements for stored representations of information. Any number of other arrangements may be employed besides those suggested by tables illustrated in the drawings or elsewhere. Similarly, any illustrated entries of the databases represent exemplary information only; one of ordinary skill in the art will understand that the number and content of the entries can be different from those disclosed herein. Further, despite any depiction of the databases as tables, other formats including relational databases, object-based models, and/or distributed databases may be used to store and manipulate the data types disclosed herein. Likewise, object methods or behaviors of a database can be used to implement various processes such as those disclosed herein. In addition, the databases may, in a known manner, be stored locally or remotely from a device that accesses data in such a database. In embodiments where there are multiple databases in the motion data extraction and vectorization system (MDEVS) 300, the databases may be integrated to communicate with each other for enabling simultaneous updates of data linked across the databases, when there are any updates to the data in one of the databases.

The method and the motion data extraction and vectorization system (MDEVS) 300 disclosed herein can be configured to work in a network environment comprising one or more computers that are in communication with one or more devices via a network. The computers may communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to a network. Each of the computers and the devices executes an operating system, examples of which are disclosed above. While the operating system may differ depending on the type of computer, the operating system provides the appropriate communications protocols to establish communication links with the network. Any number and type of machines may be in communication with the computers.

The method and the motion data extraction and vectorization system (MDEVS) 300 disclosed herein are not limited to a particular computer system platform, processor, operating system, or network. One or more aspects of the method and the MDEVS 300 disclosed herein may be distributed among one or more computer systems, for example, servers configured to provide one or more services to one or more client computers, or to perform a complete task in a distributed system. For example, one or more aspects of the method and the MDEVS 300 disclosed herein may be performed on a client-server system that comprises components distributed among one or more server systems that perform multiple functions according to various embodiments. These components comprise, for example, executable, intermediate, or interpreted code, which communicate over a network using a communication protocol. The method and the MDEVS 300 disclosed herein are not limited to be executable on any particular system or group of systems, and are not limited to any particular distributed architecture, network, or communication protocol.

The foregoing examples have been provided merely for the purpose of explanation and are in no way to be construed as limiting of the method and the motion data extraction and vectorization system (MDEVS) 300 disclosed herein. While the method and the MDEVS 300 have been described with reference to various embodiments, it is understood that the words, which have been used herein, are words of description and illustration, rather than words of limitation. Further, although the method and the MDEVS 300 have been described herein with reference to particular means, materials, and embodiments, the method and the MDEVS 300 are not intended to be limited to the particulars disclosed herein; rather, the method and the MDEVS 300 extend to all functionally equivalent structures, methods and uses, such as are within the scope of the appended claims. Those skilled in the art, having the benefit of the teachings of this specification, may effect numerous modifications thereto and changes may be made without departing from the scope and spirit of the method and the MDEVS 300 disclosed herein in their aspects.

We claim:

1. A method, performed by an image capture device, for extracting and vectorizing motion data of an object in motion, said method comprising:
   receiving, at a motion data processor of the image capture device, video data from an image sensor of said image capture device, said video data comprising a series of image frames of said object in motion;
   detecting, by said motion data processor, said object in motion from said series of image frames of said received video data to isolate said object in motion;
   identifying, based on said isolation of said object in motion, a type of said object in motion;
   extracting, by said motion data processor, first motion data of said object in motion via a default extraction algorithm for a first frame of said series of image frames;
   dynamically selecting a second extraction algorithm based at least in part on said type of said object in motion;
   extracting, by said motion data processor, second motion data of said object in motion from subsequent frames of said series of image frames, wherein said second motion data is extracted via the second extraction algorithm;
   performing a linear transformation on said first motion data and said second motion data to generate at least one vector that represents said object in motion;
   compiling said at least one vector in a matrix configured to define said object in motion by the motion data processor.

2. The method of claim 1, further comprising:
   maintaining said matrix in a storage unit for one or more of local storage, transmission, and analysis; and
   transmitting said matrix from said storage unit to an analytics system by an operations unit in operable communication with said storage unit for said analysis, wherein said analysis comprises one or more of estimating prospective trajectory data of motion of said detected object in motion, determining a period of presence of said object, determining a velocity of traversal of said detected object in motion, and determining gestures of said object.

3. The method of claim 1, wherein said detection of said object in motion from said series of image frames by said motion data processor comprises:
   comparing said series of image frames with each other by said motion data processor for detecting said object in motion, while excluding a background of said object in motion; and
   comparing said detected object in motion with one or more object libraries by said motion data processor for confirming said detection of said object in motion.

4. The method of claim 1, wherein said second extraction algorithm is selected from a plurality of predefined data extraction algorithms.

5. The method of claim 1, wherein said first motion data and said second motion data comprises image data associated with said object in motion, trajectory data of motion of said object in motion, relative physical dimensions of said object, said type of said object in motion, spatial coordinates of said object in said each of said image frames, sequence data of said image frames, and time stamp data of said each of said image frames.

6. The method of claim 1, wherein said at least one vector is defined by two or more spatial coordinates.

7. The method of claim 1, wherein said matrix is represented by a representation box, wherein said representation box is configured to define prospective trajectory data of motion of said detected object in motion.

8. The method of claim 1, further comprising:
   compressing said video data by a data compression processor in operable communication with an image signal processor.

9. The method of claim 1, further comprising:
   compressing said extracted motion data and said matrix by a data compression processor in operable communication with said motion data processor.

10. The method of claim 1, further comprising:
    dynamically enhancing image granularity of said video data by an image signal processor in operable communication with said image sensor for facilitating said extraction of said first motion data and said second motion data from said series of image frames by said motion data processor.

11. The method of claim 1, further comprising:
    capturing one or more snapshots of said detected object in motion by said image sensor on receiving an indication from said motion data processor for facilitating identification and said analysis of said detected object in motion from said series of image frames of said video data.

12. A motion data extraction and vectorization system for extracting and vectorizing motion data of an object in motion, said motion data extraction and vectorization system comprising:
    an image sensor in operable communication with a motion data processor;
    said image sensor configured to capture video data comprising a series of image frames of said object in motion;
    said motion data processor in operable communication with said image sensor, said motion data processor configured to receive said video data from said image sensor;
    said motion data processor further configured to detect said object in motion from said series of image frames to isolate said object in motion;
    said motion data processor further configured to identify, based on said isolation of said object in motion, a type of said object in motion;

said motion data processor further configured to extract first motion data of said object in motion from a first frame of said series of image frames via a default extraction algorithm;

said motion data processor further configured to dynamically select a second extraction algorithm based at least in part on said type of said object in motion;

said motion data processor further configured to extract second motion data of said object in motion from subsequent frames of said series of image frames, wherein said second motion data is extracted via the second extraction algorithm;

said motion data processor further configured to perform a linear transformation on said first motion data and said second motion data to generate at least one vector, wherein said at least one vector represents said object in motion; and said motion data processor further configured to compile said at least one vector in a matrix configured to define said object in motion.

13. The motion data extraction and vectorization system of claim 12, further comprising;
a storage unit in operable communication with said motion data processor, said storage unit configured to maintain said matrix for one or more of local storage, transmission, and analysis, and
an operations unit in operable communication with said storage unit, wherein said operations unit is configured to transmit said matrix from said storage unit to an analytics system for said analysis,
wherein said analytics system is configured to perform said analysis comprising one or more of estimating prospective trajectory data of motion of said detected object in motion, determining a period of presence of said object, determining a velocity of traversal of said object in motion, and determining gestures of said object.

14. The motion data extraction and vectorization system of claim 12, wherein said motion data processor is configured to perform said detection of said object in motion from said series of image frames by:
comparing said series of image frames with each other for detecting said object in motion, while excluding a background of said object in motion; and
comparing said detected object in motion with one or more object libraries for confirming said detection of said object in motion.

15. The motion data extraction and vectorization system of claim 12, wherein said second extraction algorithm is selected from a plurality of predefined data extraction algorithms.

16. The motion data extraction and vectorization system of claim 12, wherein said first motion data and said second motion data comprises image data associated with said object in motion, trajectory data of motion of said object in motion, relative physical dimensions of said object, said type of said object, spatial coordinates of said object in said each of said image frames, sequence data of said image frames, and time stamp data of said each of said image frames.

17. The motion data extraction and vectorization system of claim 12, wherein said at least one vector is defined by two or more spatial coordinates.

18. The motion data extraction and vectorization system of claim 12, wherein said matrix is represented by a representation box, wherein said representation box is configured to define prospective trajectory data of motion of said detected object in motion.

19. The motion data extraction and vectorization system of claim 12, wherein said image sensor is further configured to:
capture one or more snapshots of said detected object in motion on receiving an indication from said motion data processor, for facilitating identification and said analysis of said object in motion from said series of image frames.

20. The motion data extraction and vectorization system of claim 12, further comprising:
a data compression processor in operable communication with an image signal processor, wherein said data compression processor is configured to compress said video data enhanced by said image signal processor.

21. The motion data extraction and vectorization system of claim 12, further comprising:
a data compression processor in operable communication with said motion data processor, wherein said data compression processor is configured to compress said extracted motion data and said matrix received from said motion data processor.

22. The motion data extraction and vectorization system of claim 12, further comprising:
an image signal processor in operable communication with said image sensor, wherein said image signal processor is configured to dynamically enhance image granularity of said video data received from said image sensor for facilitating said extraction of said motion data from said each of said image frames by said motion data processor.

23. The motion data extraction and vectorization system of claim 12, further comprising:
an image signal processor integrated with said image sensor for enhancing image quality of said video data received from said image sensor, wherein said image signal processor is in operable communication with said motion data processor and a data compression processor positioned in parallel to each other, wherein said motion data processor is configured to extract and vectorize said first motion data and said second motion data of said detected object in motion from said video data enhanced by said image signal processor, and wherein said data compression processor is configured to compress said video data enhanced by said image signal processor.

24. The motion data extraction and vectorization system of claim 12, further comprising:
an image signal processor integrated with said image sensor for enhancing an image quality of said video data received from said image sensor, wherein said image signal processor is in operable communication with said motion data processor, wherein said motion data processor is configured to extract and vectorize said first motion data and said second motion data of said detected object in motion from said video data enhanced by said image signal processor.

25. The motion data extraction and vectorization system of claim 12, wherein said motion data processor is operably connected in series between an image signal processor and a data compression processor for said extraction and said vectorization of said first motion data and said second motion data of said detected object in motion from said video data enhanced by said image signal processor, wherein said image signal processor is integrated with said image sensor for enhancing an image quality of said video data received from said image sensor, and wherein said data compression processor is configured to compress said first motion data and said second motion data that is extracted and vectorized by said motion data processor.

26. The motion data extraction and vectorization system of claim 12, further comprising an image signal processor integrated with a data compression processor, and wherein said motion data processor is operably connected between said image sensor and said data compression processor for said extraction and said vectorization of said first motion data and said second motion data of said detected object in motion from said video data received from said image sensor, wherein said image signal processor is configured to enhance an image quality of said video data received from said image sensor, and wherein said data compression processor is configured to compress said first motion data and said second motion data that is extracted and vectorized by said motion data processor and to compress said video data enhanced by said image signal processor.

27. The motion data extraction and vectorization system of claim 12, further comprising:
an image signal processor and a data compression processor positioned in parallel communication with said motion data processor and disabled when motion of said object is not detected for optimizing power consumption for said capture of said video data.

28. The motion data extraction and vectorization system of claim 13, wherein said storage unit is further configured to:
store enhanced video data, compressed video data, said first motion data and said second motion data, compressed motion data, said matrix, and a compressed said matrix.

29. The motion data extraction and vectorization system of claim 12 configured as one or more of an integrated chip and a computer system comprising at least one processor configured to execute computer program instructions for said extraction and said vectorization of said first motion data and said second motion data of said detected object in motion.

30. A computer program product comprising a non-transitory computer readable storage medium, said non-transitory computer readable storage medium storing computer program codes that comprise instructions executable by a motion data processor, said computer program codes comprising:
a first computer program code for detecting an object in motion from a series of image frames of video data received from an image sensor to isolate said object in motion, wherein said image sensor is in operable communication with said motion data processor;
a second computer program code for identifying, based on said isolation of the object in motion, a type of said object in motion;
a third computer program code for extracting first motion data of said object in motion from a first frame of said series of image frames of said received video data via a default data extraction algorithm, wherein said first motion data comprises image data associated with said object in motion, trajectory data of motion of said object in motion, relative physical dimensions of said object in motion, said type of said object, and spatial coordinates of said object in said first frame of said image frames;
a fourth computer program code for dynamically selecting a second extraction algorithm based at least in part on said type of said object in motion;
a fifth computer program code for extracting second motion data of said object in motion from subsequent frames of said series of image frames, wherein said second motion data is extracted via the second extraction algorithm;
a sixth computer program code for performing a linear transformation on said first motion data and said second motion data to generate at least one vector, wherein said at least one vector represents said object in motion; and
a seventh computer program code for compiling said at least one vector in a matrix configured to define said object in motion for each of said image frames using said first and second motion data, maintaining said matrix in a storage unit for one or more of local storage, transmission, and analysis, and transmitting said matrix from said storage unit to an analytics system by an operations unit in operable communication with said storage unit for said analysis, wherein said analysis comprises one or more of estimating prospective trajectory data of motion of said detected object in motion, determining a period of presence of said object, determining a velocity of traversal of said detected object in motion, and determining gestures of said object.

31. The computer program product of claim 30, wherein said first computer program code further comprises:
an eighth computer program code for comparing said image frames with each other for detecting said object in motion, while excluding a background of said object in motion; and
a ninth computer program code for comparing said object in motion with one or more object libraries for confirming said detection of said object in motion.

32. The computer program product of claim 30, wherein said second extraction algorithm is selected from a plurality of predefined data extraction methods.

* * * * *